April 10, 1951      M. J. POLLEY      2,548,055
AUTOMATIC PITMAN BAR CONNECTION
Filed Sept. 4, 1947
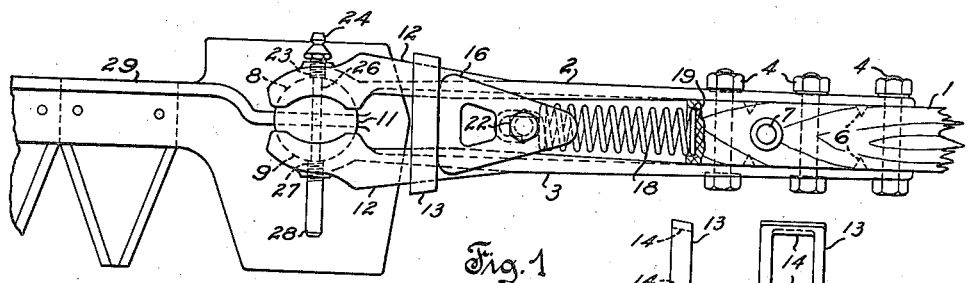
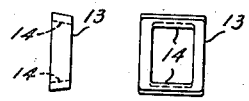
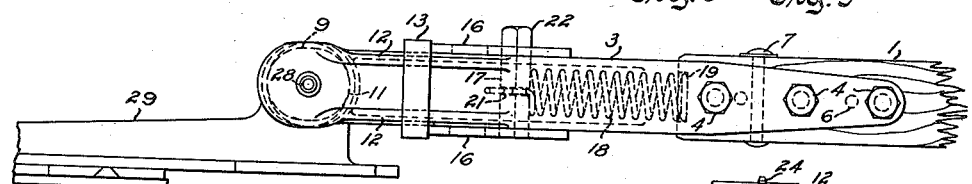
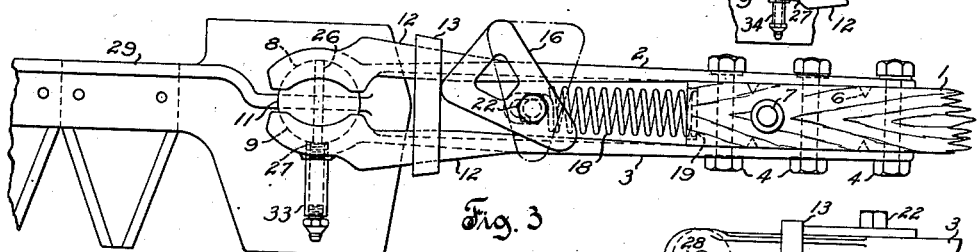
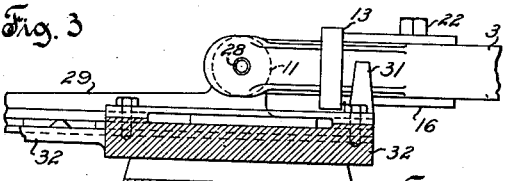
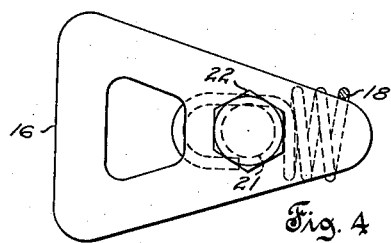
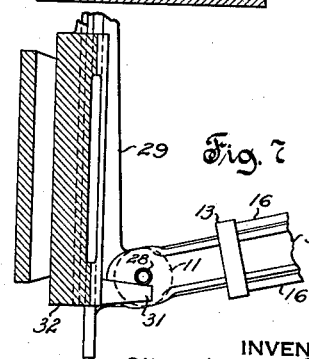
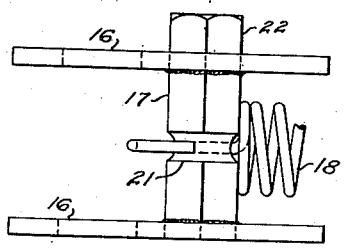
INVENTOR
Manford J. Polley
BY Kimball A. Weyman
ATTORNEY Patented Apr. 10, 1951

2,548,055

UNITED STATES PATENT OFFICE 2,548,055

AUTOMATIC PITMAN BAR CONNECTION

Manford J. Polley, Homer, Minn., assignor to Allis-Chalmers Manufacturing Company, Milwaukee, Wis., a corporation of Delaware Application September 4, 1947, Serial No. 772,061

9 Claims. (Cl. 56—303)

This invention relates generally to an improved pitman connection and more particularly to a connection used in agricultural machines such as mowers, harvesters and the like.

It is characteristic of such connections, in which strap members on the pitman are clamped to a knife head ball connector on the mower, that considerable wear occurs between the ball and the strap members and it was formerly the practice to compensate for this wear by periodically tightening bolts which clamp the strap members to the ball connector. Unless one is particularly skilled in making such an adjustment the result is usually too-tight or too-loose a connection, either of which decreases the efficiency of the flexible connection and increases the wear on the ball and socket joint. It has also been fairly common practice to use a pitman connection having an automatic wear-take-up device that includes a clamping means for the gripping portions of the straps that is usually pivotally bolted to the straps or slidable in longitudinal slots cut in the straps. This type of construction necessarily results in a weakening of the strap members. Another of the automatic wear-take-up type connections heretofore used includes a hinged connection between one of the socket forming parts and the remainder of the strap thereby affording relative movement of this hinged socket with respect to the opposing socket forming portion. Such a construction necessarily requires precision work in the formation of coacting parts and the provision of additional parts, all of which tend to increase the cost of manufacturing the connection. Another problem in pitman connections of the types heretofore known has been non-uniform wear on the knife head ball connector and the gripping surfaces bearing thereon, generally due to the unequal pressure exerted at various points on these gripping surfaces. This wear has usually resulted in a wobbly connection necessitating early and frequent replacement of parts.

It is an object of this invention to provide an improved pitman connection having an automatic wear-take-up device comprising parts constructed and combined so as not to weaken the straps gripping the ball connector, and so as to afford a large amount of wear-take-up in the connection. Furthermore, the coaction of the wear-take-up means and pitman straps with the ball connector in this invention is such that a uniform pressure is exerted on the ball by the socket portions of the straps thereby affording uniform wear on the ball and socket joint.

A still further object of this invention is to afford means for continuous lubrication of the connection in order to minimize the wear on the ball and the gripping portions of the pitman straps. It is also an object of this invention to provide a lubricant receiving means constructed to prevent sliding movement of the wear-take-up means off the free end portions of the pitman straps when these straps are pressed together.

Still another object of this invention is to provide a pitman connection, for use in a mowing machine or the like mounting a reciprocable knife thereon, which includes an outwardly projecting lubricant receiving and/or confining means coacting with adjacent parts on the machine to stop the knife in its downward sliding movement, relative to the mounting, when raised to an inoperative vertical position.

Another object of this invention is to provide an improved connection of the automatic wear-take-up type permitting all of the above mentioned advantages to be readily accomplished with a minimum number of parts, all carried by the pitman in nondetachable relatively movable relation with respect to each other, thereby preventing any of the parts from becoming lost or separated while connecting or disconnecting the pitman from the part driven thereby.

Apparatus constructed in accordance with this invention affords all of the results and advantages hereinbefore mentioned as will become readily apparent as the disclosure progresses and points out those features of construction considered of special importance. Although described as applied to a pitman connection for an agricultural machine, it will be seen that the invention has a more general application. The present invention may be considered as comprising those features of construction and/or combinations and sub-combinations of various elements as more particularly set forth in the appended claims and in the detailed description, reference being had to the accompanying drawings illustrating one embodiment of the invention, and in which:

Fig. 1 is a plan view of the pitman connection with the knife head ball connector in clamped position between the pitman straps;

Fig. 2 is a side elevation of the pitman connection shown in Fig. 1;

Fig. 3 is a plan view of the pitman connection illustrating the action of the cam plates on the collar which surrounds the pitman straps; also, a variation in the type of lubricant receiving means used is shown;

Fig. 4 shows an enlarged plan view of the connection between the cam plates and spring;

Fig. 5 is a side elevation of the connection shown in Fig. 4;

Fig. 6 is a side view of a portion of the structure shown in Fig. 1 with a conventional cutter bar and shoe (broken away and in section) added to illustrate the relationship of parts;

Fig. 7 is a side elevation of the structure in Fig. 6 with the cutter bar, knife and shoe raised to an inoperative position;

Fig. 8 is a reduced scale side elevation of the collar which surrounds the strap members;

Fig. 9 is an end view of this same collar, also reduced in scale; and

Fig. 10 is a reduced scale plan view of a third type of lubricant receiving means adaptable for use with the pitman connection shown in Fig. 1.

The specific embodiment chosen to illustrate the invention is a pitman connection for a mower. Referring to Fig. 1 it may be seen that the illustrated pitman connection comprises a pitman bar 1, preferably made of wood, having attached thereto in spaced opposed generally parallel relation a pair of similar interchangeable resilient metal straps 2 and 3. These straps are rigidly secured to pitman bar 1 by a suitable means such as bolts 4 which afford speedy detachment of the connecting parts when necessary for repair or replacement. To assist straps 2 and 3 in gripping pitman bar 1 small pointed lugs 6 may be formed on that portion of straps 2 and 3 contacting the pitman bar. As a further strengthening measure rivet 7 is positioned through pitman bar 1 transversely to the longitudinal axis of bolts 4.

At the free end portions of straps 2 and 3 are opposed socket forming portions 8 and 9 affording bearing surfaces for the knife head ball connector 11. The oppositely facing outer surfaces 12 of straps 2 and 3 converge toward pitman bar 1 and have a collar 13 surrounding the straps and slidable longitudinally thereon. As shown in Figs. 8 and 9 the inner surfaces 14 of collar 13 are inclined to conform with the converging outer surfaces 12 on strap members 2 and 3. A cam means positioned between collar 13 and pitman bar 1 includes as parts thereof cam plates 16 disposed on either side of straps 2 and 3, and a rod 17 interposed between the straps and connecting the cam plates. Cam plates 16 are in spaced opposed parallel relation to each other and slidably engage the adjacent edges of straps 2 and 3. A compression spring 18 is interposed between the cam means and the pitman, having one end portion seated in recess 19 of pitman bar 1 and the opposite end portion engaging a circular grooved portion 21 of rod 17 with the adjacent part of the spring pressing against rod 17 to urge the rod and cam plates against collar 13. (See Figs. 2 and 5.) Rod 17 extends through one of cam plates 16 to form a projection 22 affording means for turning the rod and plates relative to spring 18. (See Fig. 3.)

Referring to Figs. 1 and 3, it may be seen that to release the knife head ball connector 11 from its position between the socket portions 8 and 9 of the strap members is a simple matter. By means of a wrench, or any similarly suitable tool, cam plates 16 can be moved out of compressing relation with collar 13 by rotating projection 22 of the rod joining the plates. Upon turning cam plates 16 spring 18 will be first compressed and then released when the cam plates move out of compressing relation with collar 13 and assume the dotted line position shown in Fig. 3. Then by moving the transversely positioned cam plates 16 toward collar 13, spring 18 will be unseated from recess 19 on the pitman and drop between straps 2 and 3. However, the spring will not become detached from the grooved portion 21 of rod 17. Collar 13 and cam plates 16 can then be moved toward pitman bar 1 a sufficient distance away from the ball gripping portions 8 and 9 of the straps to relieve these portions of the compressive forces exerted thereon. By inserting any suitable tool between straps 2 and 3 in the space now provided between ball connector 11 and collar 13 the straps can be spread apart and the knife head ball connector 11 removed from its position between socket portions 8 and 9 of straps 2 and 3. It will be obvious from the foregoing explanation that the reverse procedure is applicable for reconnecting the knife to the pitman.

The free end portions of straps 2 and 3 and ball connector 11 have coaxially aligned bores through their centers. (See Fig. 1.) Bore 23 in strap 2 has seated therein a lubricant receiving means 24 comprising a conventional lubricating nozzle including the usual reservoir (not shown). It will be noted that lubricant receiving means 24 also affords a stop means for collar 13 to prevent it sliding off straps 2 and 3 when ball connector 11 is removed and the socket forming portions 8 and 9 can be pressed into contact relation with each other. Bore 26 through ball connector 11 affords means for conveying the lubricant to the opposing socket portion 9. Bore 27 in strap 3 contains a lug 28 (see Fig. 1) which functions both as a plug for the lubricating bore and as a stop means for knife 29, as presently described. Lug 28 extends outwardly from strap 3 and is adapted for coaction with an upstanding projection 31 positioned on the adjacent end portion of cutter bar 32. (See Fig. 6.) When the cutter bar is raised to a vertical position (see Fig. 7) knife 29 slides downward thereon due to the pivotal movement of pitman 1 about its crank pin (not shown). However, when the ball and socket portion of the pitman connection reaches the end of cutter bar 32 in its downward travel, lug 28 engages projecting part 31 on the cutter bar and prevents the knife from moving downwardly sufficient to cause it to bend with respect to the cutter bar.

Modifications of the above described lubricant receiving means are shown in Figs. 3 and 10. In Fig. 3 the lubricant receiving means and knife stop means are shown as having been combined into one projecting part 33 on the free end portion of pitman strap 3. This eliminates the need for a bore through strap 2.

In the connection illustrated in Fig. 10 the bore through the knife head ball connector has been dispensed with by positioning a lubricant receiving means on the free end portions of both straps 2 and 3. The lubricant receiving means 34 on strap 3 is of sufficient length to engage projecting part 31 on cutter bar 32 and afford a stop means for knife 29 as previously described.

It will be apparent from the above description that a flexible connection constructed in accordance with this invention provides simple and efficient means for automatically taking up the wear on the ball and socket joint. It will also be noted that the uniform pressure applied to the similar resilient straps results in uniform pressure and wear on the ball connector. In addition, the efficient method of providing constant lubrication for the joint minimizes the wear and extends the working life of the connection.

It will also be noted in the above description that the associated parts comprising the automatic wear-take-up means are nondetachable and therefore cannot be dropped out or lost in disconnecting the knife from the pitman. Furthermore, the simplicity of the structure including the use of similar interchangeable strap members makes the flexible connection a durable one that is inexpensive to manufacture.

It is claimed and desired to secure by Letters Patent:

1. An automatic wear-take-up device for connecting relatively movable elements comprising a first element having a connector thereon, a second element spaced from said first element, a pair of similar resilient straps secured to said second element to extend therefrom toward said first element in spaced opposed and generally parallel relation with respect to each other, said straps terminating in free end portions presenting opposed socket forming surfaces engaging said connector and having oppositely facing outer side surfaces converging toward said second element, a collar surrounding said straps and movable longitudinally thereof, cam means non-removably associated with said straps between said collar and second element for movement both longitudinally and angularly with respect to said straps, said cam means comprising a pair of plates coacting with opposite edges of said straps and a reduced portion extending between said straps and rigidly uniting said plates, a compression spring interposed between said second element and said reduced portion and having a nondetachable connection with the latter affording relative angular movement therebetween, and means projecting from one of said cam plates for effecting an angular movement of said cam means relative to said straps, collar and spring.

2. An automatic wear-take-up device for connecting relatively movable elements comprising a part adapted for connection with one element, a pair of interchangeable resilient straps secured to said part to extend therefrom in spaced opposed and generally parallel relation with respect to each other, said straps terminating in free end portions presenting spaced opposed surfaces adapted for gripping therebetween a connector on the second element and having oppositely facing outer side surfaces converging toward said part, a collar surrounding said straps and movable longitudinally thereof, cam means nonremovably associated with said straps between said collar and said part for movement both longitudinally and angularly with respect to said straps, said cam means comprising a pair of plates coacting with opposite edges of said straps and a reduced portion extending between said straps and rigidly uniting said plates, a compression spring interposed between said part and said reduced portion and having a nondetachable connection with the latter affording relative angular movement therebetween, and means projecting from said cam means for effecting an angular movement of said means relative to said straps, collar and spring.

3. In a flexible connection between two elements a pair of interchangeable resilient straps secured to the first of said elements to extend therefrom in spaced opposed and generally parallel relation with respect to each other, said straps terminating in free end portions presenting opposed socket forming surfaces adapted to receive therebetween a connector on the second of said elements and having oppositely facing outer surfaces converging toward the first element, a collar surrounding said straps and movable longitudinally thereof, cam means associated with said straps between said collar and said first element for movement both longitudinally and angularly with respect to said straps, a spring interposed between said cam means and said first element, said spring and cam means coacting with said collar to resiliently urge said socket forming surfaces toward each other and to releasably maintain said surfaces in gripping relation with respect to a connector disposed therebetween.

4. An automatic wear take-up device for connecting relatively movable elements comprising a first element having a connector thereon, a second element spaced from said first element, a pair of interchangeable resilient straps secured to said second element to extend therefrom toward said first element in spaced opposed relation with respect to each other with their oppositely facing outer surfaces converging toward said second element, said straps terminating in free end portions presenting opposed socket forming surfaces engaging said connector, a collar surrounding said straps and movable longitudinally thereof, cam means nonremovably associated with said straps between said collar and second element for movement both longitudinally and angularly with respect to said straps, a compression spring interposed between said second element and said cam means, communicating bores through said free end portions and said connector, a lubricant receiving means seated in the bore of one free end portion, and a plug means seated in the bore of the other free end portion and extending outwardly therefrom a distance sufficient to prevent said collar from becoming detached from said straps by endwise movement therealong.

5. An automatic wear take-up device for connecting relatively movable elements comprising a first element having a connector thereon, a second element spaced from said first element, a pair of interchangeable resilient straps secured to said second element to extend therefrom toward said first element in spaced opposed relation with respect to each other with their oppositely facing outer surfaces converging toward said second element, said strap terminating in free end portions presenting opposed socket forming surfaces engaging said connector, a collar surrounding said straps and movable longitudinally thereof, cam means nonremovably associated with said straps between said collar and second element for movement both longitudinally and angularly with respect to said straps, a compression spring interposed between said second element and said cam means, a bore through the free end portion of said straps communicating with said connector, and lubricant receiving means positioned in each of said bores and extending outwardly from said straps a distance sufficient to prevent said collar from becoming detached from said straps by endwise movement therealong.

6. An automatic wear take-up device for connecting relatively movable elements comprising a first element having a connector thereon, a second element spaced from said first element, a pair of interchangeable resilient straps secured to said second element to extend therefrom toward said first element in spaced opposed relation with respect to each other with their oppositely facing outer surfaces converging toward said second element, said straps terminating in free end portions presenting opposed socket forming surfaces engaging said connector, a collar surrounding said straps and movable longitudinally thereof to effect movement of said free end portions of said straps relative to each other, means interposed between said collar and said second element to selectively secure said collar in compressing relation with respect to the outer surfaces of said straps thereby maintaining said socket forming surfaces in uniform bearing relation with said connector, communicating bores through said free end portions and connector, a part seated in one of said bores and extending outwardly from the free end portion of one of said straps affording means for receiving lubricant for said socket forming surfaces, and a plug means seated in the bore of the free end portion of said other strap and extending outwardly therefrom, said part and plug means extending outwardly from said straps a distance sufficient to prevent said collar from becoming detached from said straps by endwise movement therealong.

7. In a mower including a knife, a vertically adjustable means mounting said knife for movement therewith and for reciprocation relative thereto, said knife and parts connected therewith being free to gravitate downward with respect to said mounting means when said mounting means is raised to an inoperative position, a pitman bar, a connector on the adjacent end of said knife operatively connecting said pitman bar and knife, and a projection carried by a part of said mounting means and disposed generally adjacent the connected end portion of said knife, the combination of a pitman connection comprising a pair of similar resilient strap members secured to said pitman bar and extending therefrom in spaced opposed and generally parallel relation with respect to each other, said straps terminating in free end portions presenting opposed socket forming surfaces engaging said connector, means for securing said socket forming surfaces against said connector, communicating bores through said connector and one of said free end portions, and a lubricant receiving means positioned in the bore of said one free end portion and extending outwardly from said strap, said outwardly extending lubricant receiving means being disposed generally in the path of said projection for coaction therewith to limit the downward movement of said knife relative to said mounting means when the latter is raised to an inoperative position.

8. In a mower including a knife, a vertically adjustable means mounting said knife for movement therewith and for reciprocation relative thereto, said knife and parts connected therewith being free to gravitate downward with respect to said mounting means when said mounting means is raised to an inoperative position, a pitman bar, a connector on the adjacent end of said knife operatively connecting said pitman bar and knife, and a projection carried by a part of said mounting means and disposed generally adjacent the connected end portion of said knife, the combination of a pitman connection comprising a pair of similar resilient strap members secured to said pitman bar and extending therefrom in spaced opposed and generally parallel relation with respect to each other, said straps terminating in free end portions presenting opposed socket forming surfaces engaging said connector, means including a collar surrounding said strap for resiliently urging said socket forming surfaces toward each other and for releasably maintaining said surfaces in gripping relation to said connector, and a lubricant receiving means positioned in a bore through one of said free end portions and extending outwardly from said strap, said outwardly extending lubricant receiving means being disposed generally in the path of said projection for coaction therewith to limit the downward movement of said knife relative to said mounting means when the latter is raised to an inoperative position.

9. In a pitman connection a pair of similar resilient strap members secured to a pitman bar to extend therefrom in spaced opposed relation with respect to each other with their oppositely facing outer surfaces converging toward said pitman bar, said straps terminating in free end portions presenting opposed socket forming surfaces engaging a connector on a cutting bar, a collar surrounding said straps and movable longitudinally thereof, cam means nonremovably associated with said straps for movement both longitudinally and angularly with respect to said straps, a compression spring interposed between said cam means and said pitman bar, said spring, cam means and collar coacting to compress said socket portions into engagement with said connector and releasable to permit said collar to slide along said straps away from said socket portions thereby conditioning said straps for movement of the socket end portions thereof to a position releasing said connector.

MANFORD J. POLLEY.

REFERENCES CITED

The following references are of record in the file of this patent:

UNITED STATES PATENTS

| Number | Name | Date |
| --- | --- | --- |
| 1,201,115 | Van Horne et al. | Oct. 10, 1916 |
| 2,060,150 | Warner | Nov. 10, 1936 |

FOREIGN PATENTS

| Number | Country | Date |
| --- | --- | --- |
| 68,540 | Sweden | of 1929 |
| 285,130 | Italy | May 1, 1931 |